United States Patent [19]

Harms

[11] Patent Number: 5,271,466
[45] Date of Patent: Dec. 21, 1993

[54] SUBTERRANEAN FORMATION TREATING WITH DUAL DELAYED CROSSLINKING GELLED FLUIDS

[75] Inventor: Weldon M. Harms, Duncan, Okla.

[73] Assignee: Halliburton Company, Duncan, Okla.

[21] Appl. No.: 968,804

[22] Filed: Oct. 30, 1992

[51] Int. Cl.$^5$ .............................................. E21B 43/26
[52] U.S. Cl. ..................................... 166/300; 166/308
[58] Field of Search ............... 166/270, 271, 280, 300, 166/308

[56] References Cited

U.S. PATENT DOCUMENTS

| | | | |
|---|---|---|---|
| Re. 32,302 | 12/1986 | Almond et al. | 166/308 |
| 4,488,975 | 12/1984 | Almond | 166/308 X |
| 4,619,776 | 10/1986 | Mondshine | 166/308 X |
| 5,141,655 | 8/1992 | Hen | 166/300 |

*Primary Examiner*—George A. Suchfield
*Attorney, Agent, or Firm*—Robert A. Kent

[57] ABSTRACT

A method of treating a subterranean formation utilizing a first acidic crosslinked aqueous gel followed by a second alkaline crosslinked aqueous gel having a different crosslinking agent. The first fluid assists in breaking the viscosity of the second fluid upon completion of the treatment. The first fluid may contain a gasifiable fluid which will provide a gas assist to the return of the first and second fluids upon completion of the treatment.

20 Claims, No Drawings

SUBTERRANEAN FORMATION TREATING WITH DUAL DELAYED CROSSLINKING GELLED FLUIDS

BACKGROUND OF THE INVENTION

1. Field Of The Invention

The present invention relates generally to the treatment of a subterranean formation with sequential crosslinked gelled fluids having substantially different acid/base properties. More particularly, the present invention relates to the use of an acidic delayed crosslinking gel which may have a gas present, such as nitrogen or carbon dioxide, to initially create a fracture and a second alkaline, reversible crosslinked gel to enhance fracture growth and maximize proppant introduction into the created fracture.

2. Description Of The Prior Art

Numerous subterranean formation treatments have been developed utilizing crosslinked aqueous gels. For example, a well known technique for stimulating a subterranean formation involves fracturing the formation with a viscous crosslinked aqueous gel. In general, the aqueous gel is injected down a wellbore penetrating the formation at a rate and pressure sufficient to develop hydraulic forces on the formation and create fractures therein. Continued pumping of the fluid results in extension of the fractures. Particulates, known as propping agents, are added to the gel to be deposited in the created fracture and prop the fracture open at the conclusion of the treatment to enhance subsequent hydrocarbon production from the subterranean formation.

In order to avoid the difficulties associated with pumping crosslinked gelled fluids from the surface to a subterranean formation, that is, high surface pressures and horsepower requirements for the pumps, delayed crosslinked gelled fluids have been developed. The delayed crosslinking gelled fluids utilize crosslinking agents that effect a delay between the time of addition to the gelled aqueous fluid and the onset of crosslinking of the aqueous gel. The delay is generally controlled to permit pumping of the gelled fluid into the wellbore from the surface before crosslinking occurs, thereby minimizing problems associated with pumping highly viscous fluids. Such processes are disclosed in, for example, U.S. Pat. No. 4,619,776, the entire disclosure of which is incorporated by reference.

In some applications, gases such as nitrogen or carbon dioxide are combined with the fluid. The purpose of the gas is to reduce the water content of the fluid and energize the return of the fluid following the treatment. The gas can be present in an amount of from about 5% to in excess of 90 percent. When carbon dioxide is utilized, it may be added to the fluid as a liquid and be permitted to convert to a gas in the formation or wellbore. Such processes are disclosed in, for example, U.S. Pat. No's. Re 32,302, 4,488,975 and 4,799,550, the entire disclosures of which are incorporated by reference.

For optimum production results from a treated well it is advantageous to remove as much of the treating fluid as possible after the treatment is concluded.

By the present invention, an improved method of treating a subterranean formation with delayed crosslinking aqueous gels is provided which can maximize proppant introduction while maximizing fluid returns and improving well cleanup following the treatment. The present method also provides elevated temperature stability, enhancing the ability of the fluids to effectively transport high concentrations of proppant material into created fractures.

SUMMARY OF THE INVENTION

The present invention provides a method of treating a subterranean formation wherein an acidic aqueous gel is prepared and injected first into the subterranean formation. The acidic fluid may also be admixed with a gas or gasifiable liquid and a crosslinker and introduced into the formation. The fluid crosslinks after introduction into the wellbore and when pumped at an elevated rate and pressure effects fracturing of the formation. Upon fracturing of the formation proppant may be added to the first fluid and introduced into the fracture in the formation. A second alkaline aqueous gel having a different crosslinker whose crosslinking nature is reversible when the alkalinity of the fluid is lowered below a critical level also is prepared. The second fluid also crosslinks after introduction into the wellbore. The second fluid is selected to maximize the ability to extend the created fracture and introduce proppant into the created fracture with a minimum of formation damage. After the treatment is completed, the physical and chemical properties of the first fluid assist in breaking the viscosity of the second fluid. The acidic fluid, which may contain gas, assists the return of both of the fluids from the formation upon completion of the treatment. It is to be understood that some of the advantages of the present invention can be achieved without the use of any gas.

It is an object of the present invention to provide a method of treating a subterranean formation with fluids viscosified with delayed crosslinkers and in certain cases providing a gas assist to the return of the treatment fluids.

It is a further object of the present invention to provide a method of fracturing that maximizes the amount of proppant that can be transported into a created fracture.

It is a further object to facilitate the breaking of the fluid utilized to treat the subterranean formation.

Other and further objects, features and advantages of the present invention will be readily apparent to those skilled in the art upon a reading of the description of preferred embodiments which follows.

DESCRIPTION OF THE PREFERRED EMBODIMENTS

In accordance with the method of the present invention, a first crosslinked gel is prepared by admixing a gelling agent with an acidic aqueous fluid. The fluid preferably includes a buffer to adjust and maintain the pH of the resulting aqueous gel at a level of about 1 or above and below about 7 at ambient temperature. An aqueous soluble or alcohol soluble metal ion containing crosslinking compound such as $Cr(3+)$, $Ti(4+)$, or $Zr(4+)$, $Sb(3+)$ then is combined with the gel. The crosslinking of the buffered gel by the metal ion crosslinker is delayed until the gel mixture is heated. The gel mixture crosslinks only very slowly at ambient temperature. The term "ambient temperature" is used herein to mean the temperatures normally encountered on the earth's surface. After the crosslinking gel fluid has been prepared, it is introduced by way of a wellbore into a subterranean formation. Because most subterranean formations are relatively hot, i.e., have temperatures substantially above ambient, such as in the range of from about 110° F. to 325° F., the aqueous gel fluid is heated both during passage through the wellbore and in the formation. Upon heating the aqueous gel rapidly crosslinks to form a highly viscous treating fluid in the wellbore or formation.

The presence of nitrogen or carbon dioxide in the crosslinking gel fluid does not appreciably change its delayed crosslinking characteristics. With nitrogen or carbon dioxide included, the crosslinking gel fluid is particularly suitable for use in carrying out subterranean formation fracturing procedures, both wherein the carbon dioxide or nitrogen are commingled with the gel fluid and where it is foamed therewith. A commingled fluid generally contains carbon dioxide or nitrogen in an amount of from about 5% to about 50% by volume of the fluid, and a foam contains higher concentrations of nitrogen or carbon dioxide as the internal phase, i.e., up to in excess of 96% by volume of the fluid. In both forms of fluids, the crosslinking of the aqueous gel portion of the fluids preferably is substantially delayed until the fluids are heated by the formation.

The aqueous liquid can comprise substantially any aqueous liquid which does not adversely react with the components of the delayed crosslinking gel fluid. The aqueous liquid can comprise, for example, fresh water or salt solutions. Preferably, the aqueous liquid is a salt solution containing about 2% or 3% potassium chloride or other ionic compound which functions to stabilize the formation to be treated.

The gelling agent can be any of a variety of hydratable organic polymeric compounds. Preferably, the gelling agent is a natural material such as guar gum, derivatized guar guam or derivatized cellulose. Polysaccharide polymers containing carboxymethyl groups, e.g., carboxymethylguar, carboxymethylhydroxyethylguar, carboxymethylhydroxypropylguar, carboxymethylhydroxyethylcellulose, carboxymethylhydroxypropylcellulose, and so on also may be used. Of these carboxymethylhydroxypropylguar and carboxymethylhydroxyethylcellulose are the most preferred for use with a zirconium IV containing crosslinking compound.

The above described carboxylated gelling agents are hydratable whereby they form a gel in an aqueous liquid, and when at a pH of about 4 and above, the gel is delayedly crosslinkable by a zirconium IV—containing compound to produce a crosslinked gel having good viscosity at high temperatures. When the crosslinking agent is combined with the aqueous gel, the crosslinking reaction that takes place is very slow at ambient temperature and therefore delayed. As indicated above, when the aqueous gel is heated by the formation, the crosslinking reaction takes place at a relatively rapid rate. While various buffers can be utilized, particularly suitable buffers are sodium diacetate or a weak acid such as acetic, fumaric or formic acid and in some instances a source of carbonate such as sodium bicarbonate or carbonate may be added to the acid.

Crosslinking compounds which are useful in accordance with this invention are antimony III, chromium III, titanium IV or zirconium IV containing compounds which are soluble in hydrated aqueous gels and which are capable of forming a crosslinked structure with the gelling agent used. Examples of compounds which supply zirconium IV ions are, for example, zirconium lactate, zirconium carbonate, zirconium acetylacetonate and zirconium diisopropylamine lactate. Of the foregoing compounds, zirconium lactate is preferred. Compounds capable of supplying antimony III, chromium III and titanium IV ions are well known to those of any skill in the art and comprise similarly conventional compounds such as potassium pyroantimonate, titanium acetylacetonate, titanium triethanolamine, chromium III citrate and the like.

When carbon dioxide is admixed with the fluid, it should be understood that the pH of the gel generally will be lowered. The lower pH resulting from the presence of the carbon dioxide does not adversely affect the delay in crosslinking or gel stability. The lower pH may significantly reduce or eliminate the quantity of buffer required to achieve a pH below about 7 in the gelled fluid.

In carrying out the method of the present invention, the organic gelling agent used, for example, carboxymethylhydroxypropylguar, is admixed with an aqueous liquid such as fresh water containing about 2% by weight potassium chloride whereby the gelling agent is hydrated and an aqueous gel is formed. Generally, the gelling agent is admixed with the aqueous liquid in an amount in the range of from about 0.15% to about 1.0% by weight of the aqueous liquid and preferably in an amount of 0.35% to about 0.60% by weight of the aqueous liquid.

A buffer, such as sodium diacetate, preferably is combined with the aqueous gel in an amount sufficient to result in and maintain the pH of the aqueous gel at a level of about 1 or above and below about 7 at ambient temperature before addition of any carbon dioxide. Generally, the buffer will be present in an amount in the range of from about 0.01% to about 0.25 by weight of aqueous liquid.

In a preferred embodiment of the present invention, the zirconium IV—containing crosslinking compound, preferably zirconium lactate because of its availability and economy, is combined with the buffered aqueous gel in an amount whereby the zirconium in the (+4) oxidation state is present in an amount in the range of from about 0.5% to about 7% by weight of gelling agent utilized.

The resulting gel mixture together with nitrogen or carbon dioxide is pumped into the formation to be treated and upon being heated, crosslinks to further viscosify the gelled fluid. The fluid is pumped at a rate and pressure sufficient to create at least one fracture in the subterranean formation. If desired, after fracture initiation, proppant may be admixed with the gelled fluid and introduced into the created fracture during continued fluid injection.

To enhance proppant placement and fluid cleanup while attempting to minimize formation damage caused by the treatment fluids a second treatment fluid is introduced into the formation behind the first gelled fluid.

The second treatment fluid is prepared by admixing an aqueous fluid, a polysaccharide viscosifier which is capable of being crosslinked with borate as the gelling agent, a buffer and a source of borate as a crosslinking agent. In a preferred embodiment of the invention, the borate is provided from a delayed release source of borate.

The aqueous fluid can be of the same type as the previously described aqueous liquid, however, agents that substantially increase the alkalinity of the gel will have to be introduced into the aqueous fluid.

The polysaccharide gelling agent, may be of the same types as previously described such as the galactomannans and derivatives thereof such as guar gum, hydroxyethyl guar, hydroxypropyl guar and the like. Preferred gelling agents are carboxymethylhydroxypropyl guar, hydroxypropyl guar and guar gum. Generally the gelling agent is admixed with the aqueous liquid in an amount in the range of from about 0.15% to about 1% by weight of the aqueous liquid. Preferably, the gelling agent is present in an amount of from about 0.35% to about 0.6% by weight of the aqueous liquid. The gelling agent hydrates in the aqueous liquid to form a gelled fluid.

Prior to addition of the crosslinking agent to the fluid, a buffer is added to the fluid to raise the pH to a level above 8 and most preferably above about 10. The buffer can comprise, for example, a solution of sodium hydroxide, other aqueous soluble alkali or alkaline hydroxides, alkali carbonates and the like.

The borate crosslinking agent may be any material which supplies borate ions in solution. Thus, the borate crosslinking agent can be any convenient source of borate ions. For example, the borate source may be a rapidly soluble borate source such as boric acid, borax or "POLYBOR" manufactured by U.S. Borax. The borate source may also be a slowly soluble borate, such as alkaline earth metal borates, alkali metal alkaline, earth metal borates and mixtures thereof. Exemplary minerals which are representative of these classes of borates are as follows:

1. Probertite: $NaCaB_5O_9 \cdot 5H_2O$
2. Ulexite: $NaCaB_5O_9 \cdot 8H_2O$
3. Nobleite: $CaB_6O_{10} \cdot 4H_2O$
4. Gowerite: $CaB_6O_{10} \cdot 5H_2O$
5. Frolovite: $CaB_2B_4O_8 \cdot 7H_2O$
6. Colemanite: $Ca_2B_6O_{11} \cdot 5H_2O$
7. Meyerhofferite: $Ca_2B_6O_{11} \cdot 7H_2O$
8. Inyoite: $Ca_2B_6O_{11} \cdot 13H_2O$
9. Priceite: $Ca_4B_{10}O_{19} \cdot 7H_2O$
10. Tertschite: $Ca_4B_{10}O_{19} \cdot 20H_2O$
11. Ginorite: $Ca_2B_{14}O_{23} \cdot 8H_2O$
12. Pinnoite: $MbB_2O_4 \cdot 3H_2O$
13. Paternoite: $MbB_8O_{13} \cdot 4H_2O$
14. Kurnakovite: $Mg_2B_6O_{11} \cdot 15H_2O$
15. Inderite: $Mg_2B_6O_{11} \cdot 15H_2O$
16. Preobrazhenskite: $Mg_3B_{10}O_{18} \cdot 4\frac{1}{2}H_2O$
17. Hydroboracite: $CaMgB_6O_{11} \cdot 6H_2O$
18. Inderborite: $CaMgB_6O_{11} \cdot 11H_2O$
19. Kaliborite (Heintzite): $KMg_2B_{11}O_{19} \cdot 9H_2O$
20. Veatchite: $SrB_6O_{10} \cdot 2H_2O$ The sparingly soluble borate is preferably hydrated as indicated by the minerals set forth above.

The presence of borate results in crosslinking of the gelled fluid. The use of a delayed source of borate results in crosslinking of the gelled fluid after introduction into the wellbore penetrating the subterranean formation, thereby minimizing hydraulic horsepower requirements and pressures necessary to pump the gelled fluid.

The resulting gel is pumped into the wellbore after the first gelled fluid to further extend the created fracture and to introduce a propping agent into the created fracture. The propping agent can comprise any of the well known particulates that are suitable for such usage, such as, for example, sand, resin coated sand, particulate ceramics, sintered bauxite particulates and the like. The propping agent can be admixed with the gelled fluid in an amount of from about ⅛th to about 20 pounds per gallon of gelled fluid. The propping agent can be admixed with the gelled fluid in any suitable mixing apparatus either before or after addition of the crosslinking agent to the gelled fluid. The quantity of proppant that can be transported by the borate crosslinked fluid is generally greater than the quantity of proppant that can be transported by a foamed fluid.

The first and second gelled fluids also can contain fluid loss control additives, clay stabilizers, surfactants, such as foaming agents and the like, oxygen scavengers, alcohols, breakers and the like.

In some instances it may be desirable to introduce a spacer fluid into the wellbore between the first and second gelled fluids. The spacer functions to separate the two fluids during introduction into the formation to prevent premature breaking of the borate crosslinked gel by the acidic first gelled fluid. The spacer fluid may comprise, for example, water, gelled water, or crosslinked gel. These spacer fluids may contain gas, commingled or foamed.

An advantage of the present method is the rapid reduction in viscosity of the gelled fluids upon conclusion of the stimulation treatment. Mixing of the acidic first gelled fluid with the alkaline second gelled fluid in the subterranean formation reduces the pH of the boron crosslinked gel to a level below which the crosslink bonds are stable. While the specific pH at which the "uncrosslinking" occurs is unknown, it has been observed that notice able reductions in fluid viscosity occur upon reduction in the fluid pH to a level of 8 or below. The gas which is present then assists in flowing back the treatment fluids from the subterranean formation. In some instances, it may be desirable to perform the forgoing treatment without any gasifiable fluid in the first delayed crosslinked fluid. In such an instance the fluid is returned to the wellbore by pumping on the well or by fluid flow, such as high pressure natural gas flow, from the formation to the wellbore upon opening the wellbore at the surface.

To further illustrate the present invention and not by way of limitation, the following example is provided.

EXAMPLE

It was desired to stimulate a gas bearing sandstone formation at a depth of about 9000 ft. in southwestern Texas. The wellbore contained perforations over an interval of about 10 feet and the liner contained 2⅜" tubing to bottom. A base gel containing 35 lb/1000 gal of 3% KCl water was prepared with carboxymethylhydroxypropyl guar. The pH was adjusted to a level of about 5.5. A crosslinker comprising a zirconium IV ion source was added at the surface immediately prior to injection of the fluid into the wellbore. The wellbore was loaded with fluid and injection initiated at about 18 BPM at a pressure sufficient to fracture the formation. After introduction of about 30,000 gallons of crosslinked fluid, injection of the first gelled fluid was replaced with a second gelled fluid. The second fluid comprised a base gel of carboxymethylhydroxypropyl guar present in an amount of 35 lb/1000 gal of 3% KCl water. The pH of the gel was adjusted to a level of about 9.5. The fluid was crosslinked by the addition of a borate ion source immediately prior to injection into the wellbore. Proppant was admixed with the gel and introduced into the wellbore at a rate of 2 pounds per gallon of gel in the first 3000 gals, 4 pounds per gallon of gel in the next 5000 gals, 6 pounds per gallon of gel in the next 3000 gals and 8 pounds per gallon of gel for the next 7500 gals for a total of about 104,000 pounds of proppant. The proppant bearing fluid was then flushed from the wellbore with the second gelled fluid without proppant. The total treatment utilized about 50,000 gallons of gelled fluid. The wellbore was shut in for a period to permit a reduction in fluid viscosity and fracture closure to occur after which treatment fluid flowback was initiated. The returned treatment fluid was found to contain the uncrosslinked second gel and to have a pH below about 8.

While particular embodiments of the invention has been described, it is to be understood that such descriptions are presented for purposes of illustration only and that the invention is not limited thereto and that reasonable variations and modifications will be apparent to one having skill in the art without departing from the spirit and scope of the invention.

What is claimed is:

1. A method of fracturing a subterranean formation comprising:
   preparing a first aqueous gel by admixing a first gelling agent with an aqueous liquid;
   combining a buffer with said first aqueous gel in an amount sufficient to result in a pH in the aqueous gel of from about 1 to about 7 at ambient temperature;
   combining a crosslinking compound with said first aqueous gel in an amount sufficient to result in crosslinking of said first aqueous gel;
   introducing said first crosslinker-containing aqueous gel into said subterranean formation at a rate and pressure sufficient to create at least one fracture in said formation;
   preparing a second aqueous gel by admixing a second gelling agent with an aqueous liquid;
   combining a buffer with said second aqueous gel in an amount sufficient to result in a pH in the second gel of at least above about 8 at ambient temperature;
   combining a borate crosslinking agent with said second aqueous gel in an amount sufficient to effect crosslinking of said second aqueous gel;
   introducing said second borate crosslinker-containing aqueous gel behind said first aqueous gel to extend said created fracture in said formation; and
   breaking at least a portion of said second gel by contact with said first gel in said subterranean formation.

2. The method of claim 1 wherein said first gelling agent is selected from the group consisting of guar, hydroxypropylguar, carboxymethylhydroxypropyl guar and carboxymethylhydroxyethylcellulose.

3. The method of claim 1 wherein said first gelling agent is admixed with said aqueous liquid in an amount in the range of from about 0.15% to about 1% by weight of said aqueous fluid.

4. The method of claim 1 wherein said buffer comprises at least one member selected from the group consisting of sodium diacetate, acetic acid, fumaric acid, or formic acid.

5. The method of claim 1 wherein said zirconium IV—containing crosslinking compound comprises at least one member selected from the group of zirconium lactate, zirconium carbonate, zirconium acetylacetonate and zirconium diisopropylamine lactate.

6. The method of claim 1 wherein the buffer is sodium diacetate and the zirconium IV—containing crosslinking compound is zirconium lactate.

7. The method of claim 1 defined further to include the step of admixing carbon dioxide or nitrogen with said first delayed crosslinking aqueous gel prior to introducing said gel into said formation.

8. The method of claim 1 wherein said second gelling agent is selected from the group consisting of guar gum, hydroxypropyl guar and carboxymethyl-hydroxypropyl guar.

9. The method of claim 1 wherein said second gelling agent is admixed with said aqueous liquid in an amount in the range of from about 0.15% to about 1% by weight of said aqueous liquid.

10. The method of claim 1 wherein the pH of said second aqueous gel is adjusted to a level above about 10.

11. The method of claim 1 defined further to include the step of admixing a propping agent with at least a portion of said first or second crosslinker-containing aqueous gel prior to introduction into said subterranean formation.

12. The method of claim 1 defined further to include the step of introducing a spacer fluid into said subterranean formation after introduction of said first delayed crosslinker-containing aqueous gel and prior to introduction of said second crosslinker-containing aqueous gel.

13. A method of fracturing a subterranean formation comprising:
   preparing a first aqueous gel by admixing a first gelling agent with an aqueous liquid;
   combining a buffer with said first aqueous gel in an amount sufficient to result in a pH in the gel of from about 1 to about 7 at ambient temperature;
   admixing a zirconium IV-containing crosslinking compound with said first aqueous gel in an amount sufficient to result in delayed crosslinking of said first aqueous gel;
   admixing carbon dioxide or nitrogen with said first aqueous gel in an amount of from about 5% to about 96% by volume of the mixture;
   introducing said first aqueous gel mixture into said subterranean formation at a rate and pressure sufficient to create at least one fracture in said formation;
   preparing a second aqueous gel by admixing a second gelling agent with an aqueous liquid;
   combining a buffer with said second aqueous gel in an amount sufficient to result in a pH in the gel of at least about 8 at ambient temperature;
   admixing a borate crosslinking agent with said second aqueous gel in an amount sufficient to effect crosslinking of said second aqueous gel;
   introducing said second crosslinking aqueous gel into said subterranean formation to extend said at least one fracture created therein; and
   breaking at least a portion of said second gel by contact with said first gel in said subterranean formation.

14. The method of claim 13 wherein said first gelling agent is selected from the group consisting of carboxymethylhydroxypropyl guar, guar gum, hydroxypropyl guar and carboxymethylhydroxyethyl cellulose.

15. The method of claim 14 wherein said first gelling agent is admixed in an amount of from about 0.35% to about 0.6% by weight of said aqueous liquid.

16. The method of claim 13 wherein said zirconium IV—containing crosslinking compound comprises at least one member selected from the group of zirconium lactate, zirconium carbonate, zirconium acetylacetonate and zirconium diisopropylamine lactate.

17. The method of claim 13 wherein said second gelling agent comprises at least one member selected from the group of guar gum, hydroxypropyl guar and carboxymethylhydroxypropyl guar.

18. The method of claim 17 wherein said second gelling agent is admixed with said aqueous liquid in an amount of from about 0.35% to about 0.6% by weight of the aqueous liquid.

19. The method of claim 13 wherein the pH of said second aqueous gel is adjusted to a level of at least about 10.

20. The method of claim 13 defined further to include the step of introducing a spacer fluid into said subterranean formation after introduction of said first crosslinking aqueous gel and prior to introduction of said second crosslinking aqueous gel.

* * * * *